United States Patent
Nakamura

(10) Patent No.: US 8,184,518 B2
(45) Date of Patent: May 22, 2012

(54) OPTICAL DISC APPARATUS AND METHOD FOR CONTROLLING THE SAME

(75) Inventor: Toshiteru Nakamura, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/832,188

(22) Filed: Jul. 8, 2010

(65) Prior Publication Data

US 2011/0199883 A1      Aug. 18, 2011

(30) Foreign Application Priority Data

Feb. 15, 2010   (JP) ................................. 2010-029656

(51) Int. Cl.
    *G11B 7/00*      (2006.01)
(52) U.S. Cl. ....................................... 369/94; 369/44.26
(58) Field of Classification Search ............... 369/44.27, 369/44.28, 94, 47.27, 275.3, 53.22, 44.25, 369/44.26, 53.28, 53.35
    See application file for complete search history.

(56) References Cited

U.S. PATENT DOCUMENTS

| | | | | |
|---|---|---|---|---|
| 5,903,530 | A  * | 5/1999 | Tateishi et al. | 369/44.27 |
| 5,974,009 | A  * | 10/1999 | Tamura et al. | 369/44.29 |
| 6,101,156 | A  * | 8/2000 | Tanaka et al. | 369/44.28 |
| 7,054,240 | B2 * | 5/2006 | Song et al. | 369/44.29 |
| 7,792,002 | B2 * | 9/2010 | Nakatani et al. | 369/94 |
| 7,852,715 | B2 * | 12/2010 | Hosokawa et al. | 369/44.27 |
| 7,933,175 | B2 * | 4/2011 | Imagawa | 369/44.23 |

FOREIGN PATENT DOCUMENTS

JP      2009-059468      3/2009

* cited by examiner

*Primary Examiner* — Nabil Hindi
(74) *Attorney, Agent, or Firm* — Antonelli, Terry, Stout & Kraus, LLP.

(57) ABSTRACT

In recording or reproducing data on or from an optical disc with recording multi-layers, the focusing is likely to be out of control when an inter-layer jumping is carried out for changing a recording layer on or from which data is to be recorded or reproduced to another one. An optical disc apparatus is arranged to obtain an objective lens shift position that makes the focus signal S-character waveform better balanced in advance by learning and to carry out the inter-layer jumping at the shift position when jumping an optical pickup from one layer to another on a multilayered optical disc. The jumping at this shift position makes it possible to prevent out of focus and to stably make the recording or reproducing quality excellent.

10 Claims, 6 Drawing Sheets

OPTICAL DISC APPARATUS AND METHOD FOR CONTROLLING THE SAME

INCORPORATION BY REFERENCE

The present application claims priority from Japanese application JP2010-029656 filed on Feb. 15, 2010, the content of which is hereby incorporated by reference into this application.

BACKGROUND OF THE INVENTION

The present invention relates to an optical disc apparatus which is arranged to record or reproduce data on or from an optical disc with multiplied recording layers.

A background art of the technical field to which the invention pertains has been published in the Official Gazette of JP-A-2009-59468. The Official Gazette describes the invention "which is arranged to record or reproduce data on or from a multiplied optical disc having at least a first and a second recording layers through an objective lens with a numeric aperture of 0.8 or more as stably jumping a pickup between the layers".

Today, with respect to record or reproduction of data on or from an optical disc with multiplied recording layers, the following problem has been raised. That is, for recording or reproducing data on or from an optical disc with multiplied recording layers, when jumping a pickup from one recording layer or another, the focus control is run off.

SUMMARY OF THE INVENTION

It is an object of the present invention to provide an optical disc apparatus which is arranged to prevent shift of focus control caused when jumping a pickup from one layer to another on the multiplied optical disc so as to obtain excellent recording and reproducing quality.

The foregoing object can be achieved by the invention described in the claims.

The present invention offers the optical disc apparatus which is capable of recording and reproducing data on or from an optical disc stably and accurately.

Other objects, features and advantages of the invention will become apparent from the following description of the embodiments of the invention taken in conjunction with the accompanying drawings.

DESCRIPTION OF THE INVENTION

Figure 1:
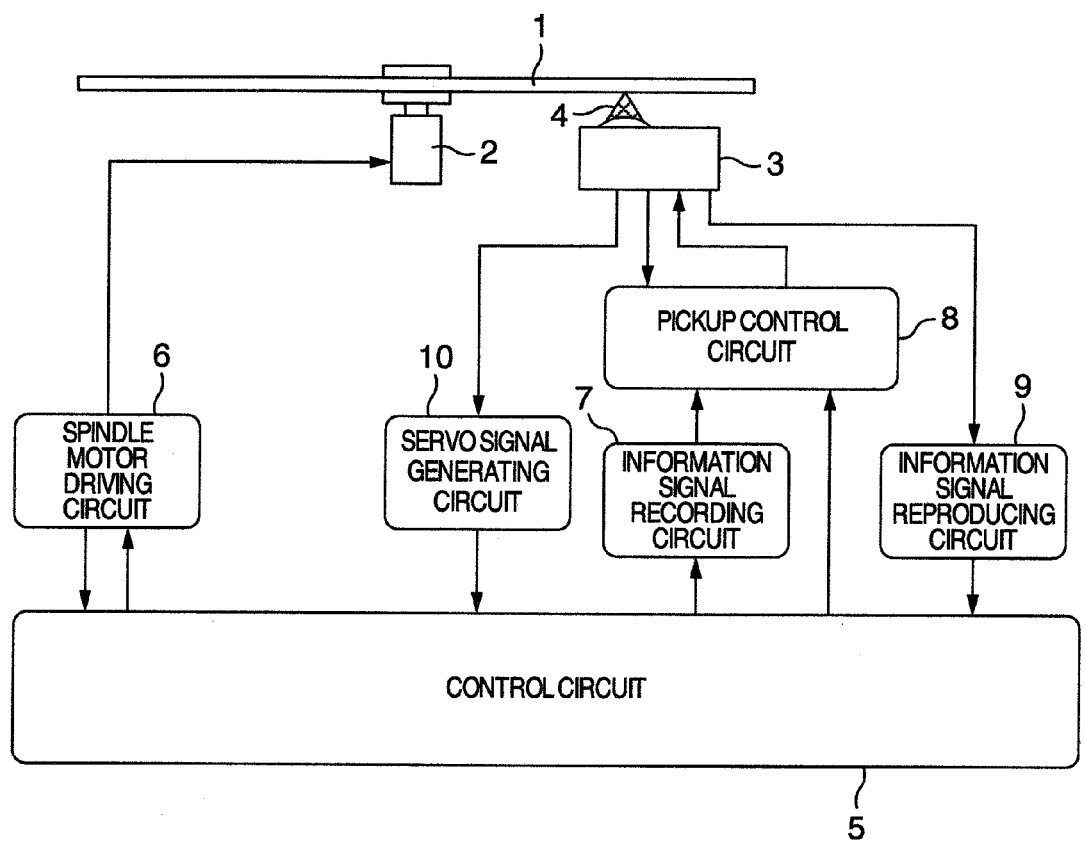
FIG. 1 is a schematic block diagram showing an exemplary arrangement of an optical disc apparatus according to the present invention.

Hereafter, the present invention will be described along the embodiments with reference to the appended drawings. In the drawings, a component with the same reference number has the same function.

[First Embodiment]

As a recent new problem with recording or reproducing data on or from an optical disc with multiplied recording layers on one side, the shift of focus control is raised. It is caused when jumping a pickup from one recording layer to another layer on or from which data is to be recorded or reproduced and therefore the jumping between the recording layers goes wrong. Hence, the present invention is made for the purpose of preventing malfunction of jumping a pickup between the recording layers and thus obtaining excellent recording and reproducing quality.

FIG. 1 is a schematic block diagram showing an optical disc apparatus according to an embodiment of the present invention. In this embodiment, for recording or reproducing data on or from an optical disc 1, as the optical disc 1 is rotated by a spindle motor 2, a laser source mounted in an optical pickup unit 3 irradiates a laser beam 4 onto the optical disc 1 and a light-sensitive element detects a beam reflected on the optical disc.

A numeral 5 denotes a control circuit that controls the overall operation of the optical disc apparatus. The rotating speed of the spindle motor is controlled by the control circuit 5 through a spindle motor driving circuit 6. The spindle motor operates to feed back the rotating speed of the optical disc to the control circuit 5.

In recording data, the control circuit 5 outputs data to be recorded to an information signal recording circuit 7. To write data onto the optical disc, the circuit 7 operates to control a luminous waveform of a laser beam, which is emitted by the laser source mounted in the optical pickup unit, through a pickup control circuit 8. In reproducing data, an information reproducing circuit 9 operates to reproduce data from an output signal sent from a light detector and then output the data to the control circuit 5.

The output signal sent from the light detector is applied into a servo signal generating circuit 10. In response, the circuit 10 generates a focus error signal (referred to as an FE signal) and a tracking error signal (referred to as a TE signal) as servo signals. In response to the servo signals, the control circuit 5 feeds back the signals to the pickup control circuit 8. Then, the pickup control circuit 8 causes an actuator mounted in the optical pickup unit to be driven so that the objective lens is properly controlled. The focus position and the tracking position of the objective lens are controlled so that the data is recorded on or reproduced from the optical disc stably and with high accuracy.

Today, the increase of a recording capacity may probably leads to increasing the recording layers of the optical disc in number. In recording or reproducing data on or from the optical disc with multiplied recording layers, when jumping a pickup from a recording layer to another one for changing the target recording layer, the focus control is made instable during the inter-layer jumping operation, so that the focus is made out of control and the recording or reproducing process is interrupted. This is also a problem.

Further, also in recording or reproducing data on or from a hybrid optical disc with recording layers of different standards, the stability in jumping a pickup between the recording layers is important. For example, the hybrid optical disc is structured to have one or more recording layers on or from which data is to be recorded or reproduced and one or more recording layers from which data is to be reproduced on one disc itself. The former recording layers are referred to as R or RE layers, while the latter recording layers are referred to as ROM layers. The structure allows the contents data stored on the optical disc to be updated by writing the update data of the contents data stored on the ROM layers onto the recordable recording layers. For this type of optical disc, when reproducing the contents data stored on the ROM layers, it is necessary to occasionally reproduce the update data stored on the R or RE layers. Hence, the inter-layer jumping operation between the ROM layer and the R or RE layer is brought about more frequently. For the optical disc apparatus adapted to recording or reproducing data on or from the hybrid optical disc, the operational stability in the inter-layer jumping process is quite important.

Figure 2:
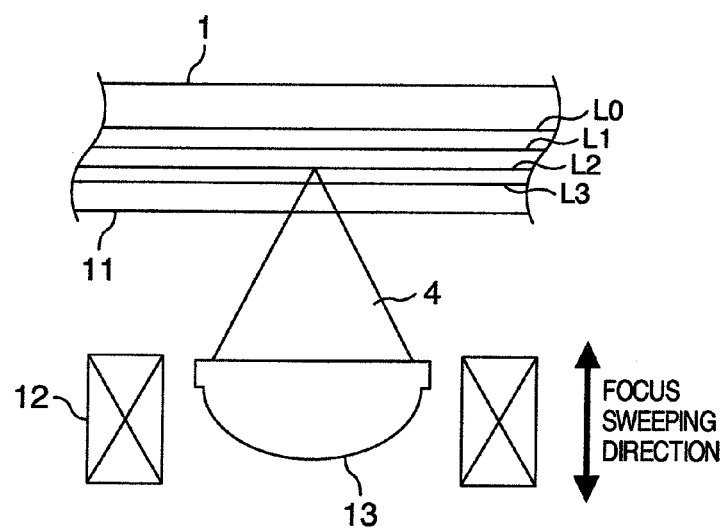
FIG. 2 is a sectional view of a multi-layered optical disc and a schematic view showing an objective lens mounted in an actuator included in the optical disc apparatus.

Hereafter, the description will be oriented to the factor of the problem. FIG. 2 shows a schematic sectional view showing a multilayered optical disc. In FIG. 2, the four-layered disc is illustrated. This optical disc includes recording layers L3 to L0 ranged from the disc surface 11 to the rear surface. In recording or reproducing data on or from the optical disc, the optical disc apparatus causes the actuator 12 of the optical pickup unit to be driven so that the focusing position of the objective lens 13 is controlled. This control causes a laser light flux 4 to be focused onto a recording layer on or from which data is to be recorded or reproduced. (Hereafter, this recording layer will be referred to as the target layer.) In FIG. 2, the recording layer L2 is the target layer. The inter-layer jumping operation means a focus control operation to be executed so that the recording layer on which the laser beam is focused is instantly changed from the current target layer on or from which data is being recorded or reproduced to another recording layer on or from which data is to be recorded or reproduced next. The error signal to be used for the servo control in the inter-layer jumping operation is a focus error signal. On the multilayered optical disc, part of light quantity is not reflected on the target layer but is reflected on the recording layer except the target layer. (Hereafter, this recording layer will be referred to as the other layer.)

Figure 3:
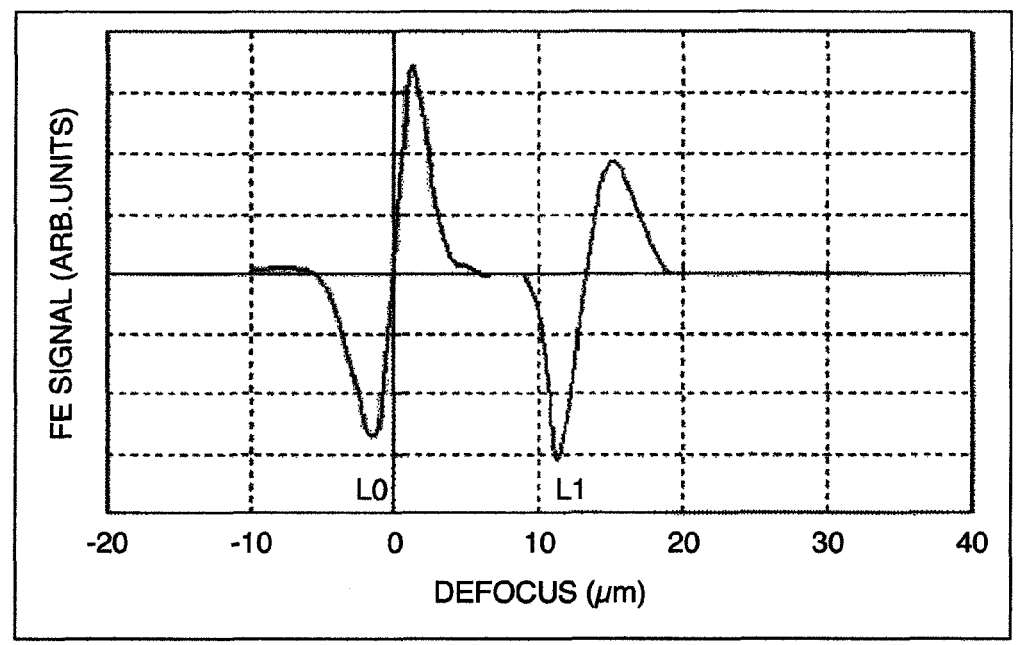
FIG. 3 is a graph showing an FE (Focus Error) signal waveform appearing when an objective lens is swept on a two-layered optical disc.

Hence, when the actuator in which the objective lens is mounted is swept in the focusing direction (vertical direction viewed in FIG. 2), detected are not only the focus error signal reflected on the target layer but the focus error signal reflected on the other layer. The curve shown in FIG. 3 is derived by simulating an FE signal waveform obtained when the objective lens 13 is swept on a two-layered disc of a commercially available blu-ray disc (referred simply to as a BD) in the focusing direction. The spacing between the recording layers of the optical disc is 25 μm. As the optical pickup unit is used a common advanced push-pull method. The focus detecting system is a double knife-edge method. The sweeping of the objective lens causes the focus error signal to be curved like an S character. Since the objective lens is swept from up to down, at first, the S-character waveform reflected on the recording layer L0 appears in the FE signal and then the S-character waveform reflected on the layer L1 appears therein. Since the spacing between the layers of the optical disc is as wide as 25 μm, the S-character signal reflected from the layer L0 is not overlapped with the S-character signal reflected from the layer L1 and the S-character signals appear independently.

Next, the description will be oriented to the optical disc with three or more layered recording layers. Assuming that the spacing between the adjacent layers is adjusted to be 25 μm like the two-layered disc, the spacing between the recording layer located closest to the disc surface and the recording layer located farthest to the disc surface is far wider than the spacing of the two-layered disc. (Hereafter, the spacing therebetween is referred to as the maximum inter-layer spacing.) Since the difference of thickness between the cover layers brings about an aberration that degrades quality of a light spot, the recording or reproducing quality is made far lower unless the aberration is corrected. For the two-layered BD with the spacing of 25 μm between the recording layers, to correct the aberration caused by the difference of thickness between the cover layers, it is common to mount spherical aberration correcting means in the optical pickup unit. As a common spherical aberration correcting means, there has been proposed means for correcting a spherical aberration caused depending on the thickness of the cover layer by changing convergence and divergence of a light flux as driving a collimate lens in the light axial direction by means of a stepping motor. When the multi-layering of the optical disc doubles the thickness of the cover layer of the disc, the aberration correcting range is made massive and accordingly the driving range of the collimate lens is made wider. As a result, the optical pickup unit is made bulky, complicated and costly. For a multi-layered disc, therefore, it is necessary to make the spacing between the adjacent layers narrower than the conventional two-layered disc if the optical disc is more-layered. If the maximum spacing of the multi-layered disc keeps the maximum spacing of the two-layered disc, the spacing between the adjacent layers of the three-layered disc is about half as wide as the spacing of the two-layered disc and the spacing therebetween of the four-layered disc is about 30% as wide as the spacing of the two-layered disc, so that the spacing between the adjacent layers of the four-layered disc may be as narrow as about 10 μm. For the optical disc with narrow spacings between the adjacent layers, in the focus error signal generated in sweeping the objective lens, the S-character waveforms reflected from plural recording layers are closed to one another and thus overlapped with one another. Hence, the distorted S-character signal waveform appears in the focus error signal.

Figure 4:
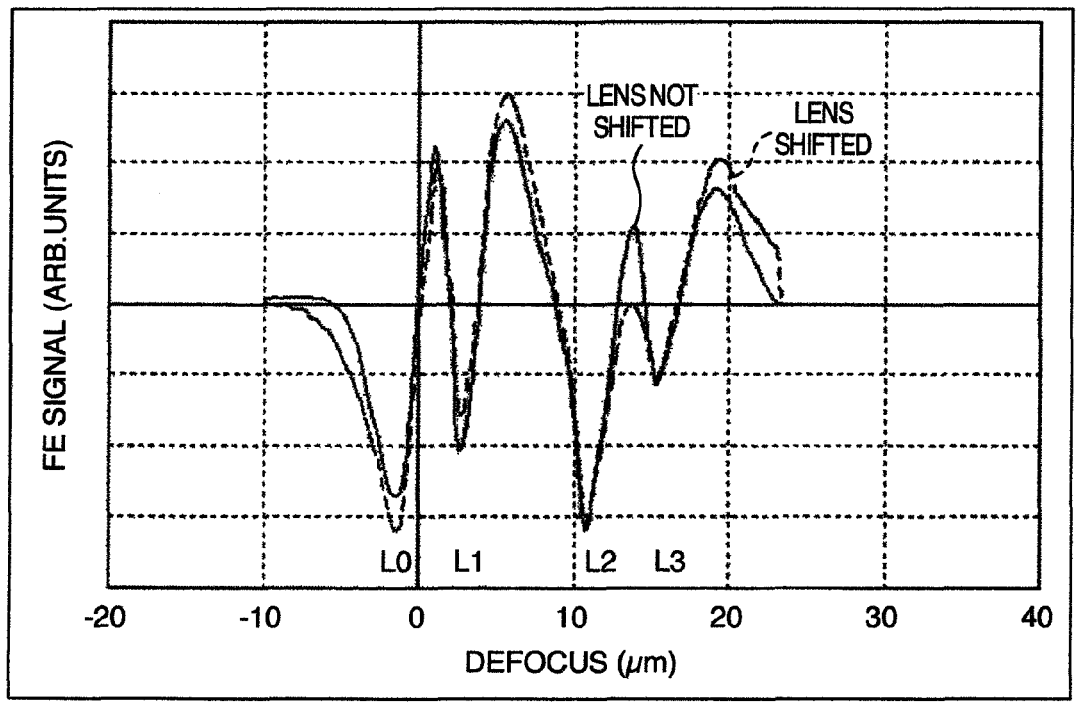
FIG. 4 is a graph showing comparison between an FE signal waveform with an objective lens shifted and an FE signal waveform with an objective lens not shifted appearing when the objective lens is swept on a four-layered optical disc.
Figure 5:
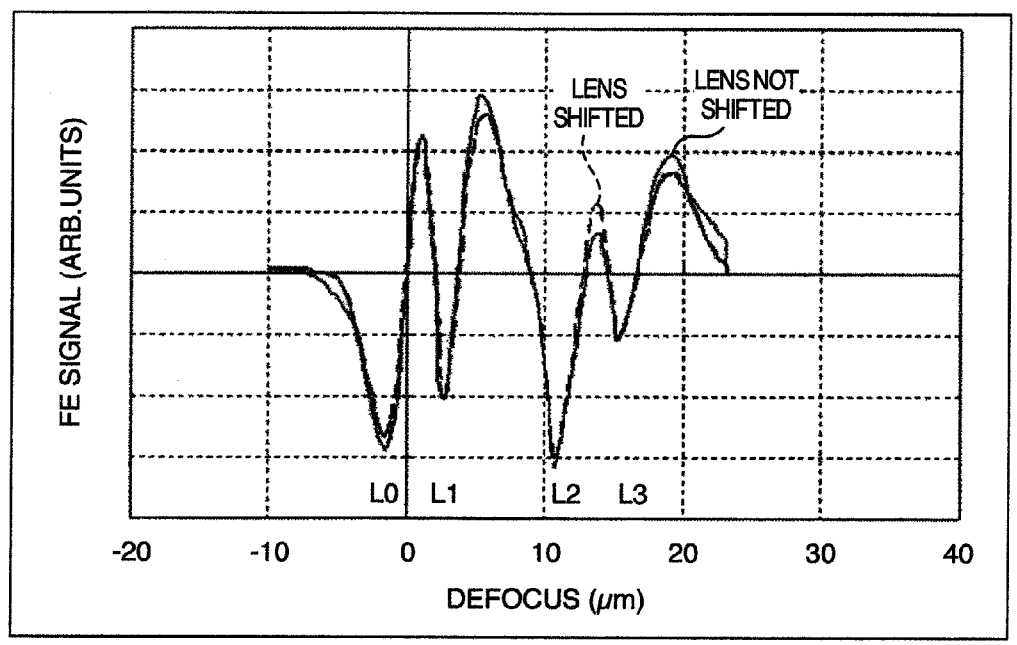
FIG. 5 is a graph showing comparison between an FE signal waveform with an objective lens shifted and an FE signal waveform with an objective lens not shifted appearing when the objective lens is swept on a four-layered optical disc with a diffractive optical element shifted in position.

FIG. 4 shows an FE signal generated in the focus sweep on the four-layered optical disc in which a spacing between the recording layers L0 and L1 is 8 μm, a spacing between the recording layers L1 and L2 is 16 μm and a spacing between the recording layers L2 and L3 is 8 μm. Since the layer spacing is narrower, the S-character signal waveforms reflected from the layers are located closer to one another than those shown in FIG. 3 and the influence of the S-character signal waveforms reflected from the layers are influenced with one another, so that the distortion and the unbalance of the waveform are going to take place. The unbalance means a difference of a magnitude between a signal amplitude appearing toward the positive side with respect to the focus control operation point (zero on the axis of ordinance) and a signal amplitude appearing toward the negative side. As the positive amplitude is more different from the negative amplitude, a magnitude of unbalance is made larger. As a factor to be more considered, the unbalance of the S-character signal waveform is varied according to the location of the objective lens in the tracking direction. FIG. 4 also shows by a broken line an EG signal waveform caused in sweeping in the focusing direction the objective lens shifted from the center of the operative range of the actuator by 0.15 mm. It is grasped from FIG. 4 that the shifted lens makes the S-character waveform more unbalanced. The distortion makes the S-character signal waveform unbalanced and thus the center of the S-character shifted from the center of the operative range. It is also grasped from the comparison between the real line and the broken line that the skirt portion of the S character signal waveform reflected on each layer is likely to be widen more, so that the S-character signals reflected on the layers are more likely to be influenced with each other. When the optical pickup unit or the optical disc is not subject to variation, it is object to obtain an ideal S-character signal waveform in the state that the objective lens is not shifted. In other words, an excellent FE signal waveform can be obtained at the middle point of the operative range of the actuator. However, when the optical pickup unit or the optical disc is subject to variation, the position of the objective lens at which the excellent S-character signal waveform appears is not defined in any unit or disc.

In the commonly used advanced push-pull type optical pickup unit, a representative performance variation factor is a positional shift of a diffractive optical element. FIG. 4 also shows an FE signal waveform caused in the positional shift of the diffractive optical element. The assumed spacing between the layers on the optical disc is the same as that shown in FIG. 3. It is understood from the comparison of the FE signal waveform between FIGS. 3 and 4 that the FE signal waveform is degraded. Moreover, FIG. 4 also plots by a broken line the FE signal waveform caused when shifting the objective lens by 0.15 mm in the tracking direction. When the diffractive optical element is shifted in position, it is understood that the S-character signal waveform caused in shifting the objective lens makes the FE signal waveform less unbalanced so that the FE signal quality is improved.

If the inter-layer jumping operation is carried out without considering the positional shift of the lens that gives rise to an excellent FE signal, a more unbalanced, that is, degraded FE signal is an index to the inter-layer jumping. As a result, the focus control is made unstable and the focus control is shifted, thereby making the reliability of the optical disc apparatus lower. Since the optical pickup unit or the optical disc is subject to its proper variation, to cause the optical disc apparatus to stably carry out the inter-layer jumping operation, it is necessary to learn the relation between the shift amount of the objective lens and the unbalance magnitude of the FE signal and cause the optical disc apparatus to carry out the inter-layer jumping at the positional shift of the objective lens that makes the unbalance of the FE signal as small as possible. This makes it possible to enhance the reliability of the inter-layer jumping operation.

The process of learning the positional shift of the objective lens that makes the unbalance of the FE signal as small as possible, that is, the FE signal excellent is carried out as follows. The optical disc apparatus performs various learning processes in the process of recognizing the optical disc. In the process of recognizing the optical disc, it is possible to learn the positional shift of the objective lens that makes the FE signal waveform less unbalanced. Concretely, the learning process includes the steps of obtaining the FE signal waveforms caused in sweeping the objective lens in the focusing direction at plural positional shifts of the objective lens and detecting the amount of unbalance in the FE signals obtained at respective positional shifts.

Then, the positional shift of the objective lens that makes the unbalance amount as small as possible is specified in light of the relation between each lens shift amount and the unbalance amount of each FE signal. It is possible to obtain a local minimum point of the unbalance amount detected at each shift position of the lens on the basis of the relation between the objective lens shift amount and the FE signal unbalance amount by a given approximation method. As the approximation method may be used a polynomial approximation method. Instead, for simplifying the operation, a linear approximation may be used as well. In this method, it is possible to calculate the position of the objective lens that makes the unbalance amount of the FE signal as small as possible as noted above and specify the position to the position to which the objective lens is to be shifted when carrying out the inter-layer jumping operation. Then, the inter-layer jumping is carried out after the objective lens is moved to an objective-lens-shifting position (often referred to as a lens shift position) P that gives rise to the excellent FE signal obtained as noted above.

Further, the position of the objective lens that gives rise to an excellent FE signal waveform depends on the position of the collimate lens to be driven as spherical aberration correcting means. The most approximate position of the collimate lens specified in carrying out the inter-layer jumping depends on the combination of the current recording layer and the next recording layer onto which the pickup is to be jumped. Hence, to enhance the stability of the inter-layer jumping operation, it is possible to obtain the lens shift position P in correspondence with each approximate position of the collimator lens given in the combination of the current and the next recording layers by means of the learning process.

Figure 6:
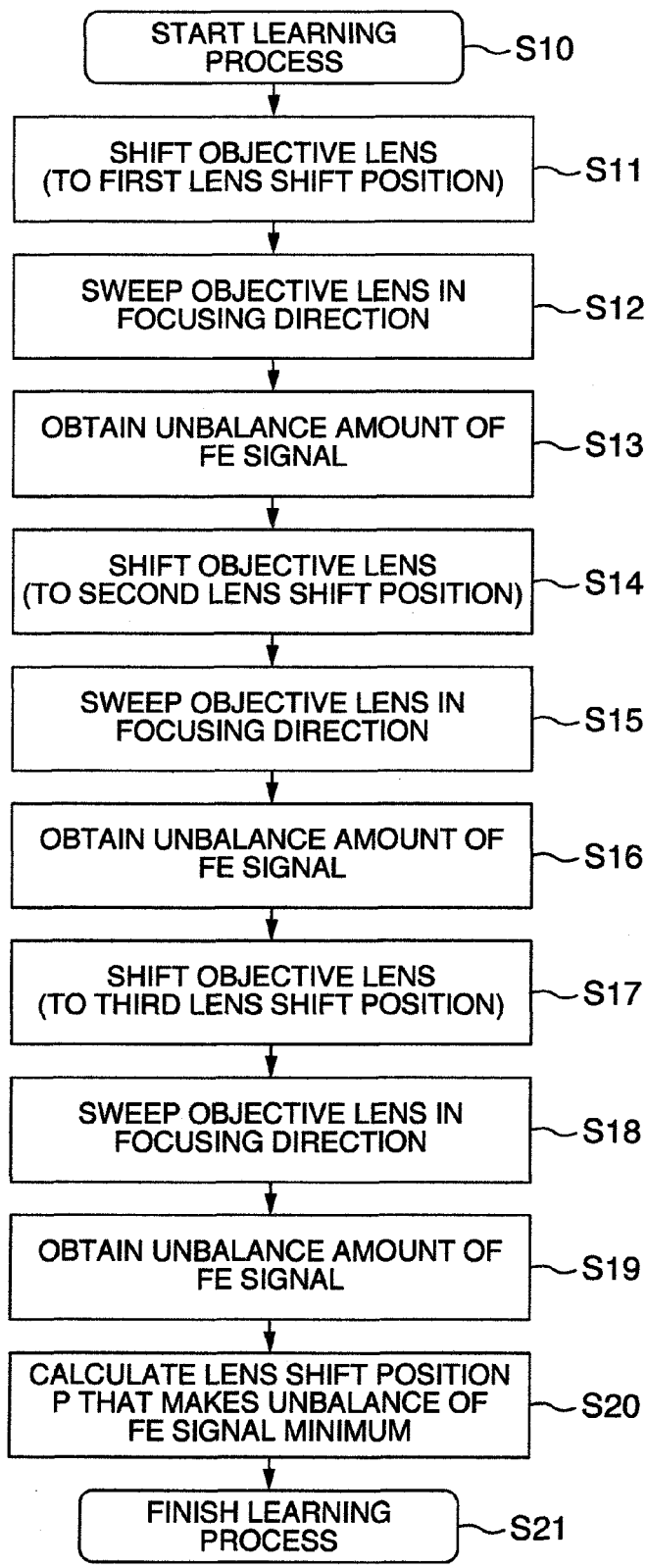
FIG. 6 is a flowchart showing a learning process included in a first embodiment of the invention.

FIG. 6 is a flowchart showing one method for learning the shift position of the objective lens that makes the FE signal waveform less unbalanced according to an embodiment of the present invention. In the process of recognizing an optical disc, the learning process is started in step S10. In step S11, the objective lens is driven in the tracking direction so that the lens is moved to a first shift position. In step S12, the objective lens is swept in the focusing direction. In step S13, the process is executed to obtain an unbalance amount of the S-character FE signal caused in sweeping the objective lens. In step S14, the objective lens is driven in the tracking direction so that the objective lens is moved to a second shift position. Then, in step S15, the objective lens is swept in the focusing direction. In step S16, the process is executed to obtain an unbalance amount of the S-character FE signal. In step S17, the objective lens is driven in the tracking direction so that the objective lens is moved to a third shift position. In step S18, the objective lens is swept in the focusing direction. In step S19, the process is executed to obtain an unbalance amount of the S-character FE signal caused in sweeping the objective lens. In step S20, the process is executed to calculate the lens shift position P that makes the unbalance amount of the FE signal minimum on the basis of the unbalance amounts of the FE signals detected at the first to the third shift positions by a predetermined approximation. In step S21, the learning process is finished. It is preferable to uniformly range the first to the third lens shift positions from the inner periphery to the outer one of the operative range of the actuator. Moreover, in this embodiment, for learning the objective lens shift position P, the three lens shift positions are used for measuring the unbalance amount of the FE signal. However, the number of the lens shift positions may be arbitrarily adjusted. More lens shift positions for measuring the unbalance amount enhance the presuming accuracy of the lens shift position P more.

Figure 7:
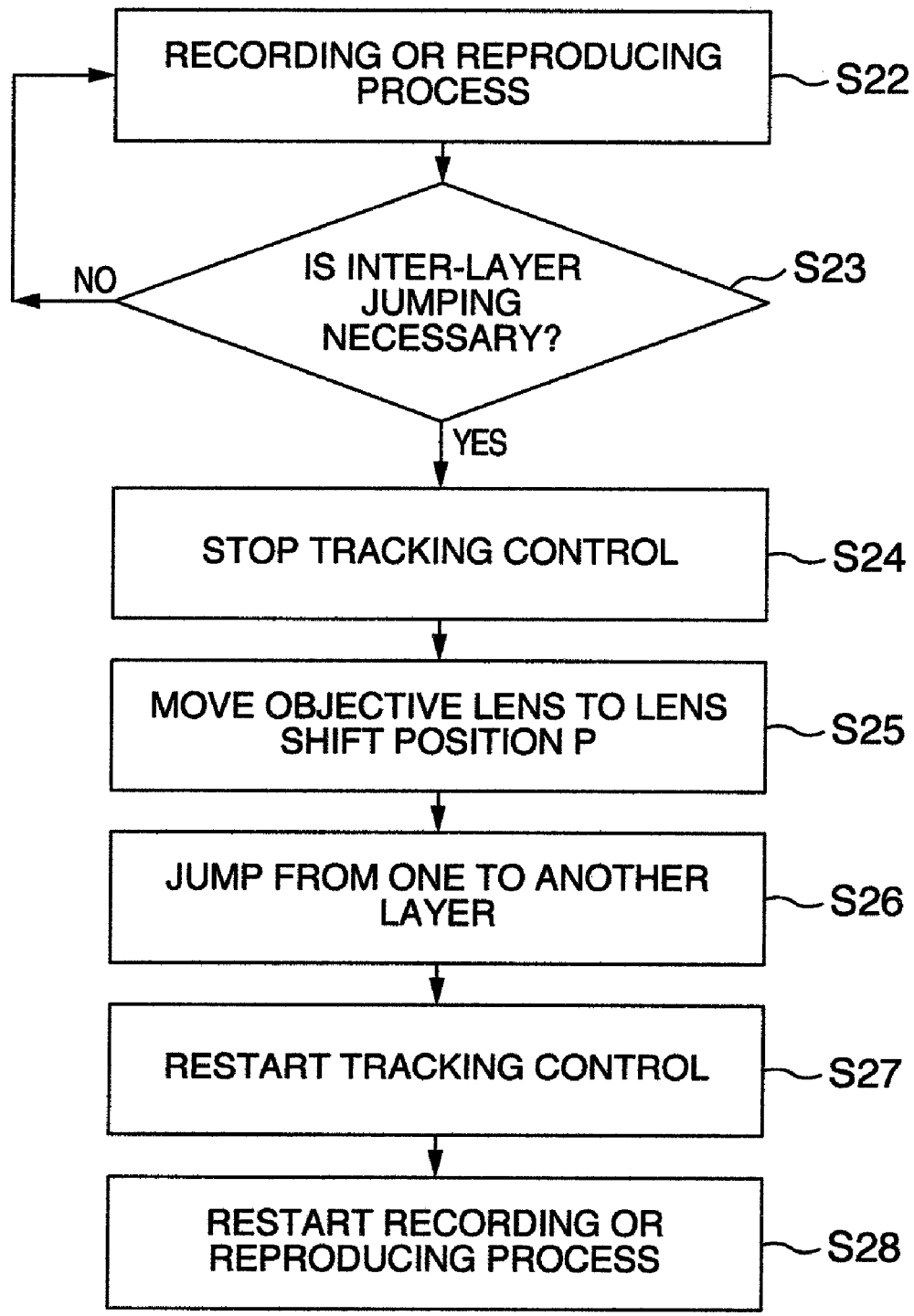
FIG. 7 is a flowchart showing an inter-layer jumping operation included in the first embodiment of the invention.

In turn, the description will be oriented to FIG. 7, which is a flowchart illustrating the inter-layer jumping operation to be executed in this embodiment. In step S22, it is determined if the inter-layer jumping is necessary while data is being recorded on or reproduced from a multi-layered optical disc. If necessary, in step S23, the tracing control is stopped. In step S24, the objective lens is moved to the lens shift position P obtained by the learning process. In step S25, the objective lens is driven in the focusing direction so that the objective lens is jumped from the current recording layer onto the next target recording layer on or from which data is to be recorded or reproduced. In step S26, the tracking control is restarted on this target recording layer. If, in the step S22, the inter-layer jumping is not necessary, the record or reproduction of data on the current recording layer is continued. The foregoing process makes it possible to carry out the inter-layer jumping operation through the use of an excellent FE signal, that is, a less waveform-distorted and unbalanced FE signal and thereby to surprisingly prevent shift of focus control in the inter-layer jumping of the pickup on a multi-layered optical disc.

The foregoing embodiment has concerned with the advanced push-pull type optical pickup unit. However, the present invention is not limited to this type of optical pickup unit. By applying the inter-layer jumping operation described with respect to this embodiment to the optical disc apparatus provided with another type optical pickup unit, it is possible to prevent malfunction of the inter-layer jumping and thereby enhance the reliability of the optical disc apparatus.

As set forth above, the present invention is characterized in enhancing various kinds of stabilities when carrying out a predetermined control process of driving the objective lens in the focusing direction. That is, when carrying out the predetermined control process of driving the objective lens in the focusing direction, the objective lens is driven to a given lens shift position obtained by the learning process, the objective lens is driven in the focusing direction at the shift position, and the predetermined control process is carried out. This process makes it possible to enhance various kinds of stabilities. The foregoing embodiment has concerned with the arrangement of enhancing the stability of the focus jumping operation as an exemplary control process. The below-described embodiment will concern with the arrangement of enhancing the stability of another control process.

[Second Embodiment]

In turn, the description will be oriented to the second embodiment of the invention. The present embodiment concerns with effective application of the lens shift position P obtained by the learning process described with respect to the first embodiment to the control process except the inter-layer jumping so that the optical disc application is made more reliable.

The optical disc apparatus according to the second embodiment may have the same arrangement of the optical disc apparatus shown in FIG. 1. The different respect of the second embodiment from the first embodiment is the application of the lens shift position P to the control process for not only the inter-layer jumping operation but another operation.

Hereafter, the focus control process to be executed through the use of the lens shift position P will be described in details.

A first application of the lens shift position P is directed to a process for pulling in a focus of an objective lens. In starting recording or reproduction of data, the optical disc apparatus performs a focus pull-in operation so that a laser beam emitted from an objective lens is focused onto any one of recording layers formed on an optical disc being rotated. In the focus pull-in operation, like the inter-layer jumping, if the FE signal is so unbalanced that the signal is shifted from the center of the focus pull-in operation, the malfunction of the pull-in operation may take place more possibly. Hence, after the objective lens is moved to the lens shift position P, the focus pull-in operation is carried out. This makes it possible to pull in the focus of the lens in response to the excellent FE signal S-character waveform, thereby being able to prevent malfunction of the focus pull-in and make the optical disc apparatus more reliable.

A second application of the lens shift position P is directed to a process for discriminating the number of the recording layers. The optical disc apparatus is required to discriminate how many recording layers are formed on the optical disc being inserted therein in the process of recognizing the optical disc. One of the indexes to discriminating the number of the recording layers is an FE signal S-character waveform. Also in this process, therefore, the FE signal is so unbalanced that the optical disc apparatus may not count the number of the recording layers of the optical disc being inserted therein accurately. If the optical discs to be inserted are not so variable and the objective lens shift position P is not so much changed for each optical disc, by sweeping the objective lens at the shift position P in the focusing direction, it is possible to obtain an excellent, that is, less unbalanced FE signal S-character waveform. In response to this excellent signal, the optical disc apparatus enables to discriminate the number of the recording layers more accurately. Moreover, by carrying out the adjustment learning operation at the lens shift position P in response to the excellent FE signal, it is possible to enhance the accuracy of the adjustment learning.

Figure 8:
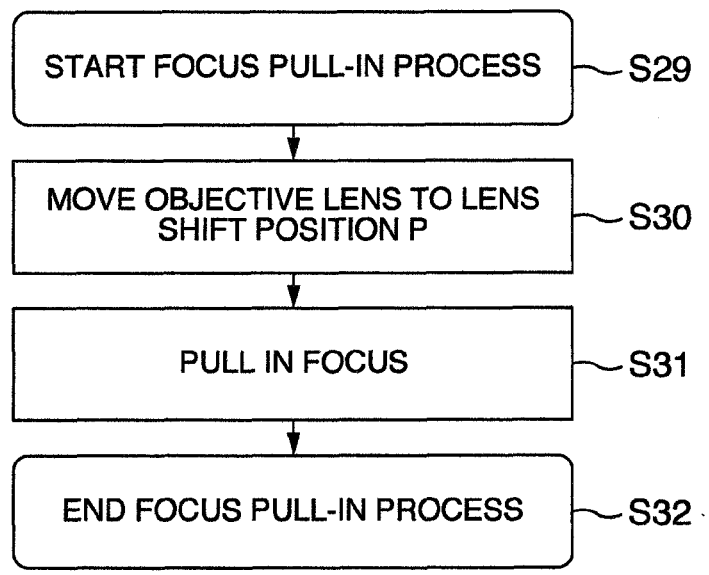
FIG. 8 is a flowchart showing a focus pull-in operation included in the second embodiment of the invention.

FIG. 8 is a flowchart showing an exemplary method for pulling in a focus of an objective lens according to the second embodiment of the invention. In step S29, the focus pull-in operation is started. In step S30, the objective lens is driven in the tracking direction so that the lens is moved to the lens shift position P. In step S31, the optical disc apparatus causes the objective lens to be driven in the focusing direction and pulls in the focus of the objective lens. In step S32, the focus pull-in operation is finished.

Figure 9:
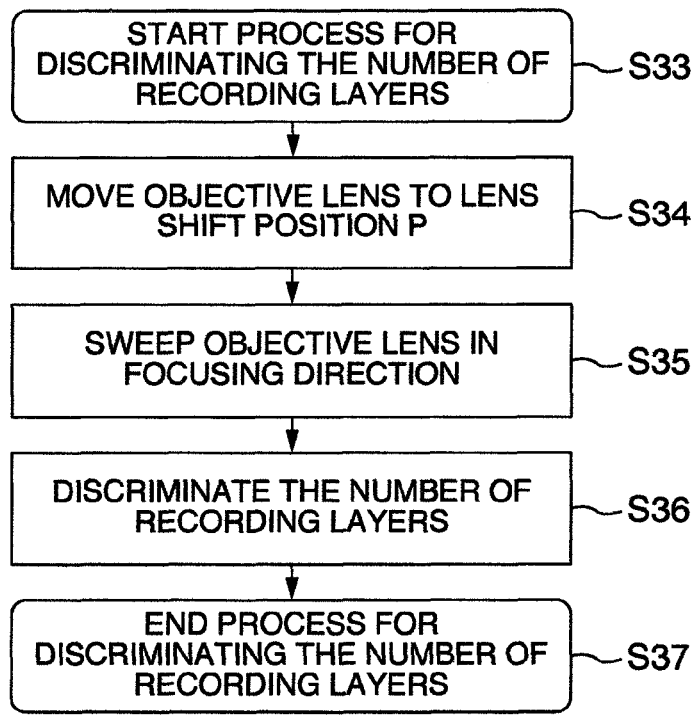
FIG. 9 is a flowchart showing a process for discriminating the number of recording layers included in the second embodiment of the invention.

FIG. 9 is a flowchart showing an exemplary method for discriminating the number of the recording layers of an optical disc according to the second embodiment of the invention. In step S33, the discrimination of the number of the recording layers is started. In step S34, the objective lens is driven in the tracking direction so that the lens is moved to the shift position P. In step S35, the optical disc apparatus causes the objective lens to be swept in the focusing direction and detects the FE signal S-character waveform. In step S36, the number of the recording layers is discriminated in response to the detected FE signal. In step S37, the discrimination is finished.

As noted above, by applying the lens shift position P described with respect to the first embodiment to the focus pull-in and the discrimination of the number of the recording layers, the second embodiment is advantageous in realizing a more reliable optical disc apparatus than the first embodiment.

[Third Embodiment]

The description will be oriented to the third embodiment of the invention. This embodiment is effective in reducing a time required for learning the lens shift position P that makes the FE signal less unbalanced more than the first embodiment. This effect makes it possible to improve the user's convenience of the optical disc apparatus.

The optical disc apparatus according to this embodiment may have the same arrangement as the apparatus shown in FIG. 1.

The different respect of the third embodiment from the first embodiment is a learning method for searching a lens shift position P that makes the FE signal S-character waveform less unbalanced. The learning method proposed in the first embodiment needs a relatively long time because plural FE signals are required to be obtained by switching the objective lens at respective shift positions in the focusing direction. To overcome this shortcoming, the third embodiment is arranged to focus attention to a PP (Push-Pull) signal, which is used together with a lens error signal when the DDP (Differential Push-Pull) type optical disc apparatus generates the TE signal. The objective lens shift position at which the balance between the positive and the negative amplitudes of the PP signal is made the most excellent is highly correlated with the lens shift position P at which the FE signal waveform is made as less unbalanced as possible. Hence, the lens shift position at which the balance of the PP signal is made the most excellent is specified as the lens shift position P to be used for the inter-layer jumping operation. Since the best balanced position of the PP signal can be grasped by moving the objective lens in the tracking direction once, it is not necessary to obtain the unbalance amounts of the FE signal S-character waveforms by sweeping the objective lens at plural positions in the focusing direction. This thus leads to reducing the learning time.

As noted above, the third embodiment is capable of reducing the time required for learning the lens shift position P that makes the FE signal waveform less unbalanced more than the first embodiment. This reduction of the learning time is advantageous in improving the user's convenience of the optical disc apparatus.

As set forth above, the optical disc apparatus according to the present invention has been described along the embodiments. The present invention is not limited to the foregoing embodiments and is improved and transformed in various modes without departing from the spirit of the invention. For example, the foregoing embodiments have been described in detail for the purpose of allowing the readers to easily understand the present invention. Those embodiments are not required to include all components described above. Moreover, part of one embodiment may be replaced with part of another embodiment and a partial arrangement of one embodiment may be added to an arrangement of another embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording or reproducing data on or from a multilayered optical disc, comprising:
   a pickup unit for focusing a laser beam onto the optical disc through an objective lens, receiving a laser beam reflected on the optical disc and detecting a signal from the received laser beam;
   the pickup unit having the objective lens and an actuator for driving the objective lens in a predetermined direction so as to perform the focus position control and the tracking position control of the objective lens;
   learning means for detecting a focus error signal by switching the objective lens at plural objective lens shift positions in the focusing direction, performing a predetermined approximation with respect to an unbalance amount between a positive amplitude and a negative amplitude of each detected focus error signal, and obtaining the objective lens shift position that makes the unbalance amount of the focus error signal minimum; and
   wherein when the actuator performs a predetermined control of driving the objective lens in the focusing direction, the actuator causes the objective lens to move to a predetermined objective lens shift position in the tracking direction by a predetermined amount and the objective lens at the predetermined objective lens shift position to move in the focusing direction.

2. The optical disc apparatus as claimed in claim 1, wherein when the optical disc apparatus performs an inter-layer jumping operation from a given layer of the multilayered optical disc to another layer other than the given layer, the actuator causes the objective lens to move to the predetermined objective lens shift position in the tracking direction by a predetermined amount and the objective lens at the objective lens shift position to move in the focusing direction.

3. The optical disc apparatus as claimed in claim 1, wherein the predetermined control process is a process of discriminating the number of layers of the optical disc by moving the objective lens in the focusing direction and obtaining the focus error signal in the process of recognizing the multiplied optical disc.

4. The optical disc apparatus as claimed in claim 1, wherein the predetermined control process is a process for pulling in a focus onto a predetermined layer of the multilayered optical disc by moving the objective lens in the focusing direction, for the purpose of starting recording or reproducing of data on or from the multilayered optical disc.

5. The optical disc apparatus as claimed in claim 1, further comprising means for providing a capability of recording or reproducing data on or from a hybrid multilayered optical disc having recoding and reproducing layers of different standards formed on the optical disc.

6. An optical disc apparatus for recording or reproducing data on or from a multilayered optical disc, comprising:
   a pickup unit for focusing a laser beam onto the optical disc through an objective lens, receiving a laser beam reflected on the optical disc and detecting a signal from the received laser beam;
   the pickup unit having the objective lens and an actuator for driving the objective lens in a predetermined direction so as to perform the focus position control and the tracking position control of the objective lens;
   a collimate lens for correcting a spherical aberration by moving the collimate lens in the optical axial direction of the laser beam;
   learning means for detecting a focus error signal by switching the objective lens at plural objective lens shift positions in the focusing direction, performing a predetermined approximation with respect to an unbalance amount between a positive amplitude and a negative amplitude of each detected focus error signal, and obtaining the objective lens shift position that makes the unbalance amount of the focus error signal minimum; and
   the learning means performs the learning process at plural optical axial positions of the collimate lens; and
   wherein when the actuator performs a predetermined control of driving the objective lens in the focusing direction, the actuator causes the objective lens to move to a predetermined objective lens shift position at which depends upon the optical axial position of the collimate lens in the tracking direction by a predetermined amount and the objective lens at the predetermined objective lens shift position to move in the focusing direction.

7. An adjustment learning method provided in an optical disc apparatus for recording or reproducing data on or from a multilayered optical disc, comprising:
- the first step of causing an actuator to be driven so that an objective lens is moved in the tracking direction;
- the second step of sweeping the objective lens at the objective lens shift position where the objective lens has moved in the focusing direction;
- the third step of obtaining an amount of unbalance between a positive amplitude and a negative amplitude of an focus error signal S-character waveform in sweeping the objective lens;
- the fourth step of causing the actuator to move the objective lens in the tracking direction;
- the fifth step of sweeping in the focusing direction the objective lens at the objective lens shift position where the objective lens has moved in the fourth step;
- the sixth step of obtaining an unbalance amount of a focus error signal when the objective lens is swept;
- the seventh step of causing the actuator to move the objective lens in the tracking direction;
- the eighth step of sweeping in the focusing direction the objective lens at the objective lens shift position where the objective lens has moved in the seventh step;
- the ninth step of obtaining an unbalance amount of a focus error signal S-character waveform when sweeping the objective lens; and
- the tenth step of calculating the objective lens shift position that makes the unbalance amount of the focus error signal minimum on the basis of the unbalance amounts of the focus error signals detected at two or more objective lens shift positions by means of a predetermined approximation.

8. A method for controlling an inter-layer jumping operation to be executed in an optical disc apparatus for recording or reproducing data on or from a multilayered optical disc, comprising, in the process of recording or reproducing data on or from the multilayered optical disc:
- a first step of determining if the inter-layer jumping is required;
- a second step of stopping tracking control if the inter-layer jumping is determined to be required in the first step;
- a third step of moving an objective lens mounted in an actuator to an objective lens shift position obtained by the adjustment learning method as claimed in claim 7;
- a fourth step of causing the objective lens to be moved in the focusing direction and jumped onto a target recording layer on or from which data is to be recorded or reproduced next;
- a fifth step of restarting tracking control on the target recording layer after the inter-layer jumping operation; and
- a sixth step of restarting recording or reproducing of data on or from the target recording layer.

9. A method for pulling in a focus of an optical disc apparatus for recording or reproducing data on or from a multilayered optical disc, comprising:
- a first step of causing an objective lens to be driven in the tracking direction and then to be moved to an objective lens shift position obtained by the adjustment learning method as claimed in claim 7; and
- a second step of pulling in a focus by driving the objective lens in the focusing direction.

10. A method for discriminating the number of recording layers in an optical disc apparatus for recording or reproducing data on or from a multilayered optical disc, comprising:
- a first step of causing an objective lens to be driven in the tracking direction and to be moved to the objective lens shift position obtained by the adjustment learning method as claimed in claim 7;
- a second step of detecting a focus error signal S-character waveform by sweeping the objective lens in the focusing direction; and
- a third step of discriminating the number of recording layers in response to the detected focus error signal.

* * * * *